United States Patent
Li et al.

(10) Patent No.: US 9,723,454 B2
(45) Date of Patent: *Aug. 1, 2017

(54) FREIGHT VEHICLE MONITORING USING TELECOMMUNICATIONS DATA

(71) Applicant: International Business Machines Corporation, Armonk, NY (US)

(72) Inventors: Ming Li, Yorktown Heights, NY (US); Milind R. Naphade, Cupertino, CA (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,305

(22) Filed: Nov. 29, 2016

(65) Prior Publication Data

US 2017/0094478 A1 Mar. 30, 2017

Related U.S. Application Data

(63) Continuation of application No. 14/811,120, filed on Jul. 28, 2015, now Pat. No. 9,571,983.

(51) Int. Cl.
*H04W 4/02* (2009.01)
*H04W 4/04* (2009.01)
(Continued)

(52) U.S. Cl.
CPC ...... *H04W 4/046* (2013.01); *G06F 17/30241* (2013.01); *G08G 1/20* (2013.01); *H04W 4/028* (2013.01)

(58) Field of Classification Search
CPC ...... G06Q 10/08; G06Q 10/0833; G08G 1/20; H04W 64/00; H04W 4/027; H04W 52/0251; H04L 67/22; H04M 2242/30
See application file for complete search history.

(56) References Cited

U.S. PATENT DOCUMENTS 6,937,855 B2 8/2005 Nadan
7,385,500 B2 6/2008 Irwin
(Continued)

FOREIGN PATENT DOCUMENTS

EP 1324241 A4 8/2001
EP 2326927 A1 4/2009
WO 0239643 5/2002

OTHER PUBLICATIONS

S. Isaacman et al., "Identifying Important Places in People's Lives From Cellular Network Data," Proceeding Pervasive '11 Proceedings of the 9th International Conference On Pervasive Computing, 2011, pp. 133-151.

(Continued)

*Primary Examiner* — Nam Huynh
(74) *Attorney, Agent, or Firm* — Keivan Razavi; Ryan, Mason & Lewis, LLP

(57) ABSTRACT

A method for freight vehicle monitoring includes obtaining historical telecommunications data, performing vehicle location identification using the historical telecommunications data, wherein performing the vehicle location identification comprises using a machine learning based algorithm to determine one or more meaningful vehicle locations, identifying, based on the one or more meaningful vehicle locations, if one or more telecommunications devices are those of a freight vehicle occupant, and tracking a location of the one or more telecommunications devices identified as those of a freight vehicle occupant.

20 Claims, 4 Drawing Sheets

(51) Int. Cl.
*G06F 17/30* (2006.01)
*G08G 1/00* (2006.01)

(56) References Cited

U.S. PATENT DOCUMENTS

| | | |
|---|---|---|
| 7,589,670 B2 | 9/2009 | Ochenbauer |
| 8,330,626 B1 | 12/2012 | Adelson |
| 2008/0122656 A1 | 5/2008 | Carani et al. |
| 2009/0170482 A1 | 7/2009 | Alessio |
| 2010/0223090 A1 | 9/2010 | Lozito |
| 2010/0250446 A1 | 9/2010 | Mackenzie et al. |
| 2010/0321179 A1 | 12/2010 | O'toole et al. |
| 2011/0281564 A1 | 11/2011 | Armitage et al. |
| 2012/0246039 A1 | 9/2012 | Fain et al. |
| 2013/0124430 A1 | 5/2013 | Moir et al. |
| 2016/0146615 A1 | 5/2016 | Abhishek |

OTHER PUBLICATIONS

Y-A. De Montjoye et al., "Unique in the Crowd: The Privacy Bounds of Human Mobility," Scientific Reports, Mar. 2013, 5 pages, vol. 3, No. 1376.

S. Schrock et al., "Feasibility of Using Cellular Telephone Data to Determine the Truckshed of Intermodal Facilities," Mid-America Transportation Center, University of Nebraska-Lincoln, Dec. 2012, 74 pages.

T. Enomoto et al., "A Freight Status Management System with Restriction to Record Loading/Unloading Information by Location," IEEE Intelligent Transportation Systems, Oct. 2003, pp. 548-553, vol. 1.

N. Zingirian et al., "Click & Find: a Third-party Internet Service for Full Tracing & Tracking of Freight," IEEE Systems Engineering, Aug. 2005, pp. 469-474.

Map Matching, http://en.wikipedia.org/wiki/Map_matching, Apr. 2015, 3 pages.

List of IBM Patents or Patent Applications Treated as Related.

FREIGHT VEHICLE MONITORING USING TELECOMMUNICATIONS DATA

TECHNICAL FIELD

The field generally relates to methods and systems for freight vehicle monitoring and, in particular, methods and systems for monitoring freight vehicle traffic using data from a telecommunications infrastructure.

BACKGROUND

Freight traffic requires a large portion of road and highway usage in the United States as well as around the world. For example, in the U.S., approximately 60% of freight is carried by trucks. It is helpful for agencies such as, for example, the U.S. Department of Transportation, to identify and monitor in real-time, freight vehicles on roads so that the agencies can optimize traffic patterns, reduce traffic congestion, plan road maintenance and maintain functioning road networks.

Currently, there is no efficient way of monitoring freight traffic. A known solution is to require that each freight company install their own global positioning system (GPS) tracking devices on their vehicles. This solution can be costly given the requirement of dedicated tracking devices and constant data connectivity (e.g., 3G data connectivity) from tracking devices to freight control centers. This solution is not scalable since freight companies may be unwilling to share the location of their vehicles with other agencies due to hardware limitations or business concerns.

SUMMARY

In general, exemplary embodiments of the invention provide a method and system for freight vehicle monitoring and, in particular, a method and system for monitoring freight vehicle traffic using data from a telecommunications infrastructure.

According to an exemplary embodiment of the present invention, a method for freight vehicle monitoring includes obtaining historical telecommunications data, performing vehicle location identification using the historical telecommunications data, wherein performing the vehicle location identification comprises using a machine learning based algorithm to determine one or more meaningful vehicle locations, identifying, based on the one or more meaningful vehicle locations, if one or more telecommunications devices are those of a freight vehicle occupant, and tracking a location of the one or more telecommunications devices identified as those of a freight vehicle occupant.

According to an exemplary embodiment of the present invention, a computer program product for freight vehicle monitoring, comprises a non-transitory computer readable storage medium having program instructions embodied therewith, the program instructions executable by a processor to cause the processor to perform the above method.

According to an exemplary embodiment of the present invention, an apparatus for freight vehicle monitoring comprises a memory, and a processing device operatively coupled to the memory and configured to obtain historical telecommunications data, perform vehicle location identification using the historical telecommunications data, wherein performing the vehicle location identification comprises using a machine learning based algorithm to determine one or more meaningful vehicle locations, identify, based on the one or more meaningful vehicle locations, if one or more telecommunications devices are those of a freight vehicle occupant, and track a location of the one or more telecommunications devices identified as those of a freight vehicle occupant.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail. This invention may be embodied in many different forms and should not be construed as limited to the embodiments set forth herein.

In general, embodiments of the present invention relate to a scalable low cost mechanism for monitoring freight traffic in real-time using signaling data from a telecommunications infrastructure. More specifically, embodiments of the present invention use advanced data mining techniques to identify cellular phones of freight vehicle occupants, such as, for example, freight vehicle drivers' cellular phones, from telecommunications records. By tracking the location of the freight vehicle occupant's cellular phones, embodiments of the present invention achieve real-time monitoring of the occupant's freight vehicles.

The embodiments of the present invention are relatively low in cost since the embodiments leverage an existing telecommunications infrastructure, such as, for example, a cellular network, and do not require any additional tracking hardware or software installed on the freight side. The methods and systems, in accordance with embodiments of the present invention, are also highly scalable since they permit monitoring of any freight vehicle that has a telecommunications device, such as a cellular phone, onboard. It is to be understood that while the embodiments are discussed in connection with cellular phones, the embodiments are not necessarily limited to cellular phones, and can be based on other telecommunications devices, such as, for example, radios, walkie-talkies, etc. The embodiments of the present invention also permit real-time monitoring using a large scale distributed computation cloud.

It is to be understood that while embodiments of the present invention are described in connection with road freight vehicles, such as, for example, trucks, vans, trailers, or other vehicles carrying cargo, the embodiments of the present invention are not necessarily limited thereto. For example, embodiments of the present invention may be applicable to monitor air, sea and rail freight vehicles, such as, for example, airplanes, boats or trains, as well as all types of passenger vehicles, such as, for example, cars, vans, busses, or air, sea and rail passenger vehicles.

In accordance with an embodiment of the present invention, a system, method or device, for example, can operate in two phases, including a freight vehicle identifying phase 101 and a freight vehicle tracking phase 102. In the freight vehicle identifying phase 101, advanced data mining techniques are used to identify and distinguish freight vehicle occupants' (e.g., freight vehicle drivers') telecommunications devices (e.g., cellular phones) from all other telecommunications devices.

Figure 1:
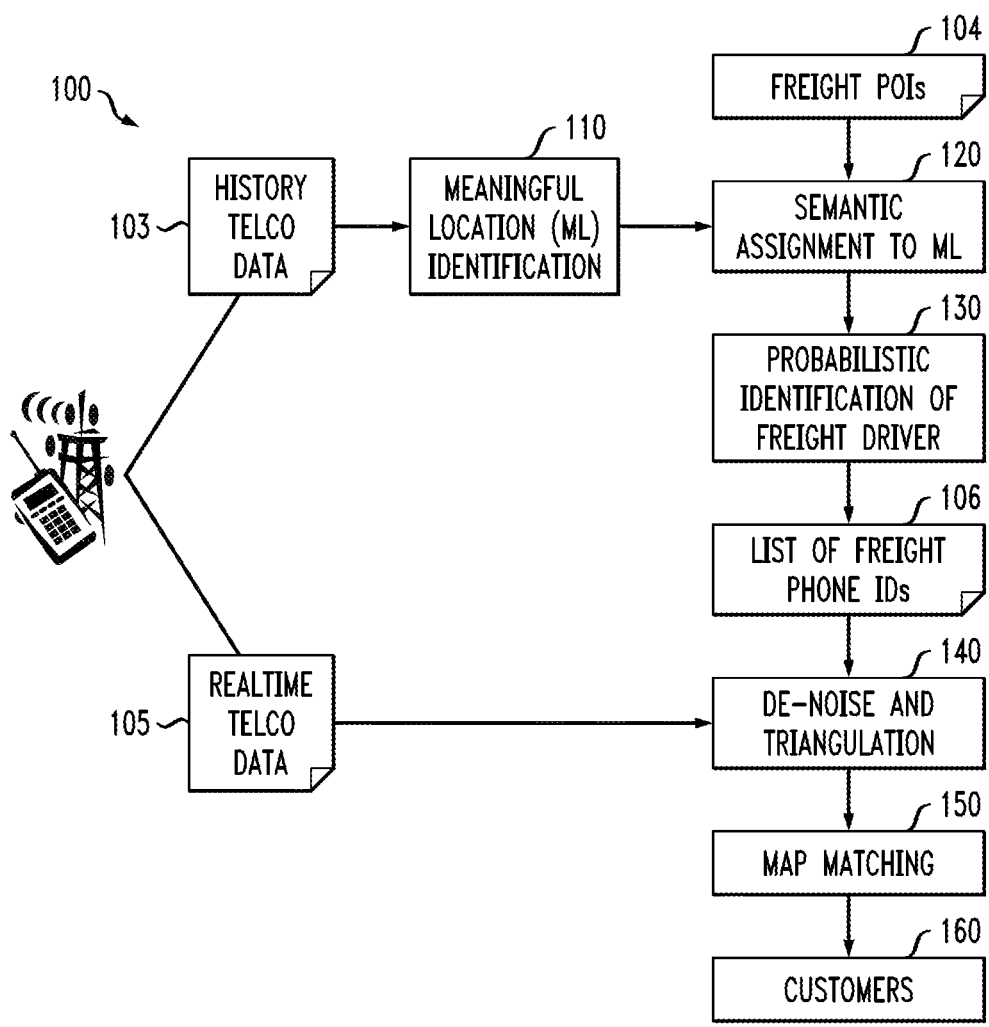
FIG. 1 is a block diagram illustrating a work flow for freight vehicle monitoring, in accordance with an exemplary embodiment of the present invention.

Referring to FIG. 1, which is a block diagram illustrating a work flow for freight vehicle monitoring, the advanced data mining techniques include using historical telecommunications data 103, such as, for example, cellular phone calls previously made by an occupant of one or more possible freight vehicles, a duration of the cellular phone calls, cell phone towers used in connection with the cellular phone calls, and/or any signaling or communications data between a cellular phone or other mobile device (e.g., tablet) and cell phone towers, to perform meaningful location identification 110. Such signaling and/or communications may occur, for example, in the absence of a cellular phone call, such as when data is being transmitted or downloaded using a cellular connection, such as when a user is browsing the Internet, or downloading content and/or software updates. It is also contemplated to gather information based on connections via WiFi or other shorter range network, using, for example, hotspots. Meaningful location identification 110 includes analyzing the historical telecommunications data to estimate a duration that each cellular phone stayed at a specific location and a frequency of visits to that location, and selecting the locations at which the phone visited most frequently and remained for a longer duration relative to other locations as the phone's meaningful locations. As used herein, "most frequently" and "a longer duration" can refer to a highest number of visits and a longest duration from a pool of locations. Meaningful location selection can also be based on a top range of visits and/or duration, such as for example, the meaningful locations being the first ranked 10 or 20 locations in order from highest number of visits and longest duration to lowest number of visits and a shortest duration of the pool of locations.

In accordance with an embodiment of the present invention, meaningful location identification 110 includes using a machine learning based algorithm for meaningful location estimation, which analyzes the historical telecommunications data 103 to determine both temporal and spatial patterns of a possible freight vehicle's travels, and permits narrowing down a freight vehicle phone's location to a freight vehicle facility.

For example, a machine learning based algorithm for meaningful location estimation, according to an embodiment of the present invention, can determine the vehicles that appear around highways versus local roads, temporal and spatial correlations between seaport and airport visits of land freight vehicles, and air and sea freight vessels, and order of visits (e.g., truck depot first, then port, then retail stores). These features help distinguish freight vehicles (e.g., trucks) from non-freight vehicles (privately-owned cars). Embodiments of the present invention include performing supervised machine learning based on relatively few known freight vehicle phones, and continuous retraining to adapt to travel pattern changes of freight vehicles, so as to convert historical telecommunications data 103 into freight vehicle origin destination patterns.

Semantic assignment of meaningful locations 120 is performed by matching geographic information system (GIS) point-of-interest data 104 to the meaningful locations previously obtained, and by assigning semantic level information to each location. The semantic level information includes, but is not necessarily limited to, address, type of building or facility (e.g., factory, warehouse, school etc.), neighborhood, city, and/or province. Semantic level information can be based upon longitudinal and latitudinal coordinates. The GIS point-of-interest data 104 includes, but is not necessarily limited to, business, hospital, school, shopping center, vehicle dealership and/or mall identifying data, such as the name of each, name of stores or vendors located therein, etc. If a location is mapped to different types of point-of-interest, all the types of point-of-interest for this location are kept and refined in a subsequent step of the workflow 100. For example, some point of interest data may be kept or discarded depending on its relevancy to obtaining a desired result and/or answer to an inquiry.

Given the meaningful locations with semantic information of each phone, probabilistic identification of freight vehicle phones 130 is performed, wherein a set of rules is used to identify if a phone is that of a freight vehicle occupant, such as a freight vehicle driver. Example of rules used include determining if a phone corresponds to delivery centers, a chassis pool, and/or retail or wholesale stores (e.g., major retail stores) as meaningful locations, and if so, concluding that there is a high probability the cellular phone is carried by a freight vehicle occupant. Chassis pools as used herein include, for example, marine terminals, rail ramps, container yards, distribution centers and warehouses.

In the freight vehicle tracking phase 102, based on a list of identified phones of freight vehicle occupants 106 created from the freight vehicle identifying phase 101, the locations of the freight phones identified in the freight vehicle identifying phase 101 are tracked. Map matching 150 is performed, which includes matching real-time locations of identified freight phones to road networks using map matching techniques. Prior to map matching 150, real-time telecommunications data 105 of the identified freight phones, such as, for example, cellular phone calls in progress or made within a specified time, duration of the calls, cell phone towers used, and/or any signaling or communications between a cellular phone or other mobile device (e.g., tablet) and cell phone towers, and shorter range network communications as noted above, and de-noise and triangulation techniques 140 are used to determine raw locations of the identified freight phones. Map matching 150 is performed since a raw location of the phones might not exactly match road locations due to a possible lack of accuracy of the real-time telecommunications data.

Map matching techniques in GIS can include associating the raw locations of the identified freight phones to a road network on a digital map. Map matching algorithms can include, for example, on-line and off-line algorithms. On-line algorithms can associate a position during a recording process to the road network, and provide real-time output. Off-line algorithms are used after data are recorded and are then matched to the road network. Real-time applications, such as online algorithms, rely on points recorded up to the real-time, whereas off-line applications can consider all points, without a real-time output.

In accordance with an embodiment of the present invention, map matching is performed in computation facility, such as, for example, a cloud computation facility, with large scale distributed computation capability to minimize delay and to ensure real-time tracking.

De-noise and triangulation techniques 140 include, for example, using multiple cellular phone towers to track a phone's location. By way of non-limiting example, a cell phone's signal may be picked up by three or more cell towers. If one knows the distance to an item from each of three distinct points, a location of that item in relation to the three reference points can be computed. In the case of cell phones, based on a known location of cell towers which receive a phone's signal, the distance of the phone from each of those towers can be estimated based upon a measurement of a time delay that a signal takes to return back to the towers from the phone. The delay is converted into distance.

After map matching 150, freight vehicle locations are streamed to customers 160. In accordance with an embodiment of the present invention, streaming of the freight vehicle locations can be performed in real-time to customers, such as, for example, traffic authorities, such as departments of transportation, or other centralized agencies or organizations responsible to traffic along designated routes or infrastructures.

As used herein, the term "real-time" refers to output within strict time constraints. Real-time output can be understood to be instantaneous or in the order of milliseconds or microseconds. Of course, it should be understood that depending on the particular temporal nature of the system in which an embodiment of the invention is implemented, other appropriate timescales that provide at least contemporaneous performance and output can be achieved.

The freight vehicle identifying phase 101 and the freight vehicle tracking phase 102 can occur in turn, or in parallel, depending on requirements of customers, and/or on how frequently new freight vehicles appear in a road network, as well as the available computation resources.

Figure 2:
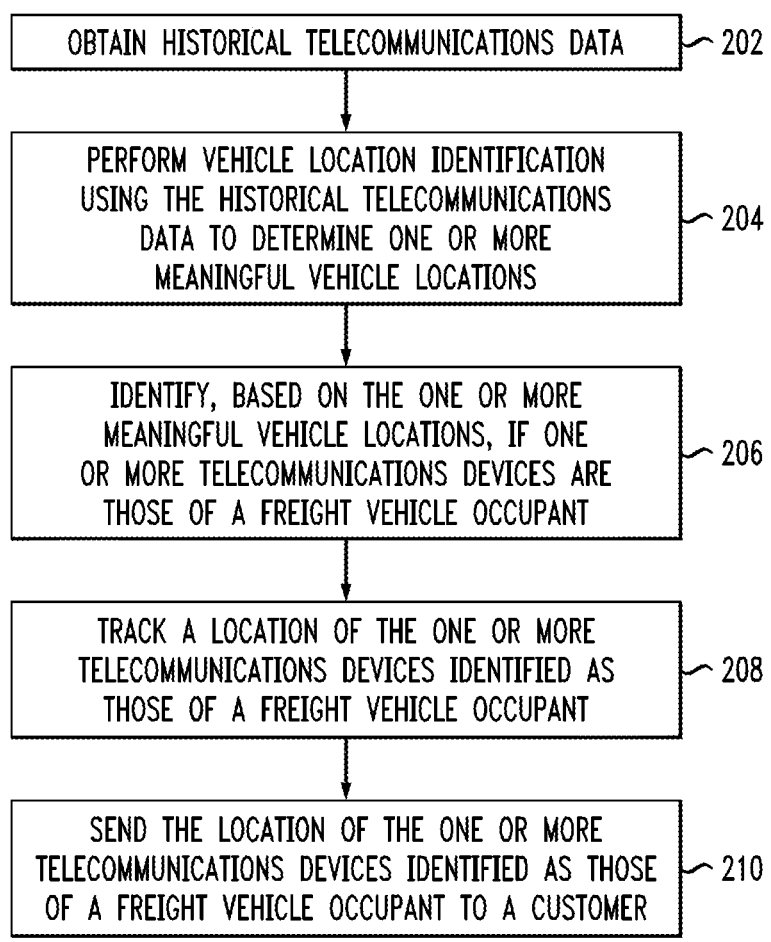
FIG. 2 is a flow diagram showing detail of a method for freight vehicle monitoring, according to an exemplary embodiment of the invention.

FIG. 2 is a flow diagram illustrating a method for freight vehicle monitoring, in accordance with an exemplary embodiment of the present invention. The method 200 comprises obtaining historical telecommunications data (block 202). The historical telecommunications data can comprise, for example, cellular phone calls made by an occupant of one or more possible freight vehicles, a duration of the cellular phone calls, and/or cell phone towers used in connection with the cellular phone calls.

The method further comprises performing vehicle location identification using the historical telecommunications data, to determine one or more meaningful vehicle locations (block 204). According to an embodiment, performing the vehicle location identification comprises using a machine learning based algorithm to determine the one or more meaningful vehicle locations. According to an embodiment, the machine learning based algorithm analyzes the historical telecommunications data to determine a temporal travel pattern and/or a spatial travel pattern of one or more possible freight vehicles. The temporal and/or spatial travel patterns can correspond to, for example, a correlation of a visit by the one or more possible freight vehicles to a port, with a visit by a freight vessel to the port. The correlation can be, for example, based on a similarity or closeness between times of arrival the one or more possible freight vehicles to a port, and a visit by a freight vessel to the port. The temporal and/or spatial travel patterns can also correspond to, for example, an order of visits to a plurality of locations (e.g., truck depot first, then port, then retail stores).

As used herein, spatial patterns can refer to, for example, a perceptual structure, placement, or arrangement of objects (e.g., vehicles) and the space in between those objects. Embodiments of the present invention can recognize patterns based on spatial arrangement, such as in a line or by a clustering of points. For example, certain freight pickup and delivery locations may have a cluster or higher density of vehicles than other locations, and there may be relationships between vehicles, such that one vehicle is located at a particular point because of another vehicle. Line patterns may, for example, lead from or to certain locations, such as a port or store, or line patterns may show a connection between one or more vehicles or locations.

As used herein, temporal patterns can refer to, for example, times of travel and how long the travel lasts, as well as relationships between when vehicles are traveling, and when they are arriving at particular locations.

The machine learning based algorithm can be trained to adapt to travel pattern changes of one or more freight vehicles.

Determining the one or more meaningful vehicle locations may include analyzing the historical telecommunications data to estimate a duration that one or more telecommunications devices associated with one or more possible freight vehicles remained at one or more locations, and selecting the one or more locations at which the one or more telecommunications devices associated with one or more possible freight vehicles remained for a longer duration relative to other locations as a meaningful vehicle location.

Determining the one or more meaningful vehicle locations can also include analyzing the historical telecommunications data to estimate a frequency that one or more telecommunications devices associated with one or more possible freight vehicles visited one or more locations, and selecting the one or more locations at which the one or more telecommunications devices associated with one or more possible freight vehicles visited most frequently relative to other locations as a meaningful vehicle location.

The method 200 can also include matching geographic information system point-of-interest data to the one or more meaningful vehicle locations, and assigning semantic level information to each of the one or more meaningful vehicle locations.

The method also includes identifying, based on the one or more meaningful vehicle locations, if one or more telecommunications devices are those of a freight vehicle occupant (block 206), tracking a location of the one or more telecommunications devices identified as those of a freight vehicle occupant (block 208), and sending, for example, in real-time, the location of the one or more telecommunications devices identified as those of a freight vehicle occupant to a customer (block 210).

Identifying if a telecommunications device is that of a freight vehicle occupant may include determining if the telecommunications device corresponds to at least one of a delivery center, a chassis pool, and a store as a meaningful location. Real-time telecommunications data may be used to determine a raw location of the one or more telecommunications devices identified as those of a freight vehicle occupant, and map matching the raw location of the one or more telecommunications devices identified as those of a freight vehicle occupant to road networks can be performed.

Figure 3:
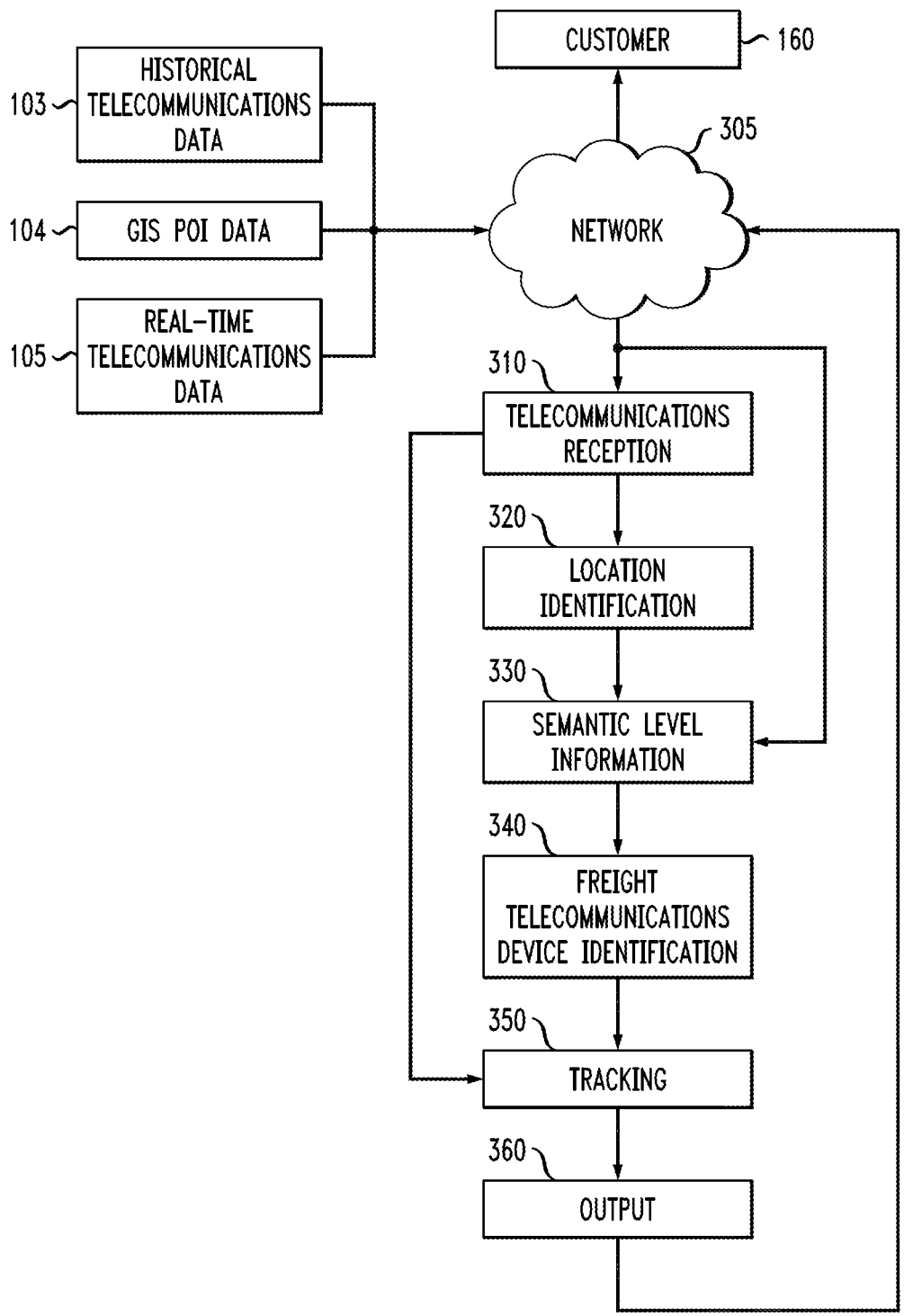
FIG. 3 is high-level block diagram showing detail of a system for freight vehicle monitoring, according to an exemplary embodiment of the invention.

FIG. 3 is a block diagram showing a system for freight vehicle monitoring, according to an exemplary embodiment of the invention. As shown in FIG. 3 by lines and/or arrows, the components of the system 300 are operatively coupled to each other via, for example, physical connections, such as wired and/or direct electrical contact connections, and wireless connections, such as, for example, WiFi, BLUETOOTH®, IEEE 802.11, and/or networks, including but not limited to, a local area network (LAN), wide area network (WAN), cellular network, satellite network or the Internet.

The system 300 for freight vehicle monitoring, comprises a telecommunications reception component 310 which is configured to receive historical and real-time telecommunications data 103, 105 via a network 305, such as one or more of the networks described above.

The telecommunications reception component 310 communicates with the location identification component 320 to send the historical telecommunications data 103 to the location identification component 320, which determines one or more meaningful vehicle locations using, for example, a machine learning based algorithm. According to an embodiment, the machine learning based algorithm analyzes the historical telecommunications data to determine temporal and/or spatial travel patterns of one or more possible freight vehicles as described herein.

The location identification component 320 may analyze the historical telecommunications data to estimate a duration that one or more telecommunications devices associated with one or more possible freight vehicles remained at one or more locations, and select the one or more locations at which the one or more telecommunications devices associated with one or more possible freight vehicles remained for a longer duration relative to other locations as a meaningful vehicle location.

The location identification component 320 may also analyze the historical telecommunications data to estimate a frequency that one or more telecommunications devices associated with one or more possible freight vehicles visited one or more locations, and select the one or more locations at which the one or more telecommunications devices associated with one or more possible freight vehicles visited most frequently relative to other locations as a meaningful vehicle location.

The system 300 also includes a semantic level information component 330 which is configured to match geographic information system point-of-interest data 104 to the one or more meaningful vehicle locations, and assigns semantic level information to each of the one or more meaningful vehicle locations.

The system 300 also includes a freight telecommunications device identification component 340 which is configured to identify, based on the one or more meaningful vehicle locations, if one or more telecommunications devices are those of a freight vehicle occupant. A tracking component 350 is configured to track a location of the one or more telecommunications devices identified as those of a freight vehicle occupant, and an output component 360 sends, for example, in real-time, the location of the one or more telecommunications devices identified as those of a freight vehicle occupant to a customer 160.

According to an embodiment, the freight telecommunications device identification component 340 can identify if a telecommunications device is that of a freight vehicle occupant by determining if the telecommunications device corresponds to at least one of a delivery center, a chassis pool, and a store as a meaningful location. The tracking component can use real-time telecommunications data 105 to determine a raw location of the one or more telecommunications devices identified as those of a freight vehicle occupant, and perform map matching of the raw location of the one or more telecommunications devices identified as those of a freight vehicle occupant to road networks.

The embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
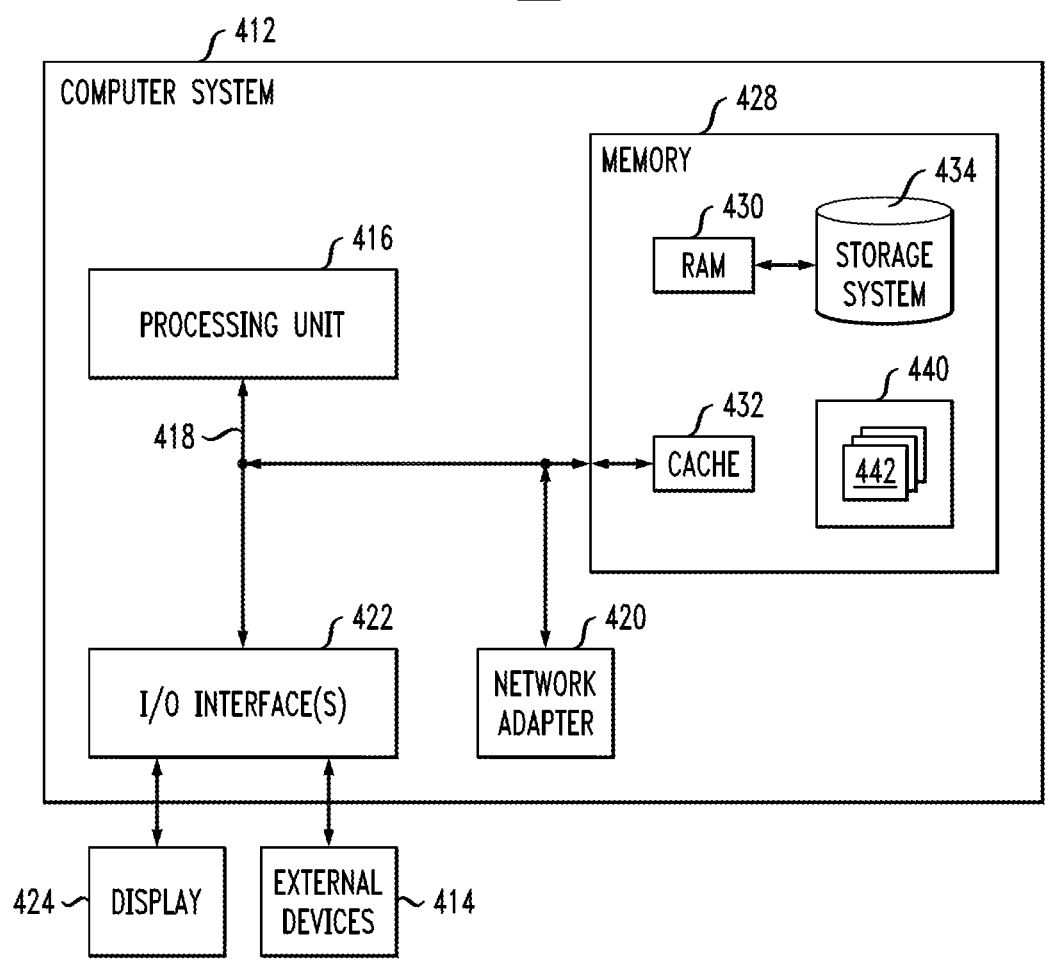
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for freight vehicle monitoring, comprising:
    obtaining historical telecommunications data;
    performing vehicle location identification using the historical telecommunications data, wherein performing the vehicle location identification comprises using a machine learning based algorithm to determine one or more meaningful vehicle locations;
    identifying, based on the one or more meaningful vehicle locations, if one or more telecommunications devices are those of a freight vehicle occupant; and
    tracking a location of the one or more telecommunications devices identified as those of a freight vehicle occupant;
    wherein determining the one or more meaningful vehicle locations comprises:
        analyzing the historical telecommunications data to estimate a value corresponding to an amount of activity of one or more telecommunications devices in connection with one or more locations; and
        selecting the one or more locations at which the one or more telecommunications devices has a greater amount of activity relative to other locations as a meaningful vehicle location;
    wherein the one or more telecommunications devices are associated with one or more possible freight vehicles; and
    wherein the obtaining, performing, identifying, and tracking steps are performed via a processing device and a memory.

2. The method of claim 1, wherein the machine learning based algorithm analyzes the historical telecommunications data to determine at least one of a temporal travel pattern and a spatial travel pattern of the one or more possible freight vehicles.

3. The method of claim 2, wherein the at least one of the temporal and the spatial travel patterns corresponds to a correlation of a visit by the one or more possible freight vehicles to a port, with a visit by a freight vessel to the port.

4. The method of claim 2, wherein the at least one of the temporal and the spatial travel patterns corresponds to an order of visits to a plurality of locations.

5. The method of claim 1, further comprising training the machine learning based algorithm to adapt to travel pattern changes of one or more freight vehicles.

6. The method of claim 1, wherein:
    the value corresponding to the amount of activity of the one or more telecommunications devices comprises a duration that the one or more telecommunications devices associated with the one or more possible freight vehicles remained at the one or more locations; and
    the one or more locations at which the one or more telecommunications devices associated with the one or more possible freight vehicles remained for a longer duration relative to the other locations is selected as the meaningful vehicle location.

7. The method of claim 1, wherein:
    the value corresponding to the amount of activity of the one or more telecommunications devices comprises a frequency that the one or more telecommunications devices associated with the one or more possible freight vehicles visited the one or more locations; and
    the one or more locations at which the one or more telecommunications devices associated with the one or more possible freight vehicles visited more frequently relative to the other locations is selected as the meaningful vehicle location.

8. The method of claim 1, wherein the historical telecommunications data comprises at least one of cellular phone calls made by an occupant of the one or more possible freight vehicles, a duration of the cellular phone calls, and cell phone towers used in connection with the cellular phone calls.

9. The method of claim 1, further comprising matching geographic information system point-of-interest data to the one or more meaningful vehicle locations, and assigning semantic level information to each of the one or more meaningful vehicle locations.

10. The method of claim 1, wherein identifying if a telecommunications device is that of a freight vehicle occupant comprises determining if the telecommunications device corresponds to at least one of a delivery center, a chassis pool, and a store as a meaningful location.

11. The method of claim 1, further comprising using real-time telecommunications data to determine a raw location of the one or more telecommunications devices identified as those of a freight vehicle occupant.

12. The method of claim 11, further comprising map matching the raw location of the one or more telecommunications devices identified as those of a freight vehicle occupant to road networks.

13. The method of claim 1, further comprising sending the location of the one or more telecommunications devices identified as those of a freight vehicle occupant to a customer, wherein the sending is performed in real-time.

14. A computer program product comprising a non-transitory computer readable storage medium having program instructions embodied therewith, the program instructions executable by a processor to cause the processor to perform a method comprising:
    obtaining historical telecommunications data;

performing vehicle location identification using the historical telecommunications data, wherein performing the vehicle location identification comprises using a machine learning based algorithm to determine one or more meaningful vehicle locations;

identifying, based on the one or more meaningful vehicle locations, if one or more telecommunications devices are those of a freight vehicle occupant; and tracking a location of the one or more telecommunications devices identified as those of a freight vehicle occupant;

wherein determining the one or more meaningful vehicle locations comprises:

analyzing the historical telecommunications data to estimate a value corresponding to an amount of activity of one or more telecommunications devices in connection with one or more locations; and selecting the one or more locations at which the one or more telecommunications devices has a greater amount of activity relative to other locations as a meaningful vehicle location; and wherein the one or more telecommunications devices are associated with one or more possible freight vehicles.

15. An apparatus, comprising:

a memory; and a processing device operatively coupled to the memory and configured to:

obtain historical telecommunications data;

perform vehicle location identification using the historical telecommunications data, wherein performing the vehicle location identification comprises using a machine learning based algorithm to determine one or more meaningful vehicle locations;

identify, based on the one or more meaningful vehicle locations, if one or more telecommunications devices are those of a freight vehicle occupant; and track a location of the one or more telecommunications devices identified as those of a freight vehicle occupant;

wherein, in determining the one or more meaningful vehicle locations, the processing device is further configured to:

analyze the historical telecommunications data to estimate a value corresponding to an amount of activity of one or more telecommunications devices in connection with one or more locations; and select the one or more locations at which the one or more telecommunications devices has a greater amount of activity relative to other locations as a meaningful vehicle location; and wherein the one or more telecommunications devices are associated with one or more possible freight vehicles.

16. The apparatus of claim 15, wherein the machine learning based algorithm analyzes the historical telecommunications data to determine at least one of a temporal travel pattern and a spatial travel pattern of the one or more possible freight vehicles.

17. The apparatus of claim 16, wherein the at least one of the temporal and the spatial travel patterns corresponds to a correlation of a visit by the one or more possible freight vehicles to a port, with a visit by a freight vessel to the port.

18. The apparatus of claim 16, wherein the at least one of the temporal and the spatial travel patterns corresponds to an order of visits to a plurality of locations.

19. The apparatus of claim 15, wherein:

the value corresponding to the amount of activity of the one or more telecommunications devices comprises a duration that the one or more telecommunications devices associated with the one or more possible freight vehicles remained at the one or more locations; and the one or more locations at which the one or more telecommunications devices associated with the one or more possible freight vehicles remained for a longer duration relative to the other locations is selected as the meaningful vehicle location.

20. The apparatus of claim 15, wherein:

the value corresponding to the amount of activity of the one or more telecommunications devices comprises a frequency that the one or more telecommunications devices associated with the one or more possible freight vehicles visited the one or more locations; and the one or more locations at which the one or more telecommunications devices associated with the one or more possible freight vehicles visited more frequently relative to the other locations is selected as the meaningful vehicle location.

* * * * *